Dec. 22, 1953 H. R. LUBCKE 2,663,757

TELEVISION APPARATUS

Filed March 6, 1950 2 Sheets-Sheet 1

INVENTOR.

Harry R. Lubcke

Dec. 22, 1953 H. R. LUBCKE 2,663,757

TELEVISION APPARATUS

Filed March 6, 1950 2 Sheets-Sheet 2

INVENTOR.

Harry R. Lubcke

Patented Dec. 22, 1953

2,663,757

UNITED STATES PATENT OFFICE 2,663,757

TELEVISION APPARATUS

Harry R. Lubcke, Los Angeles, Calif., assignor to General Teleradio, Inc., Los Angeles, Calif., a corporation of California Application March 6, 1950, Serial No. 147,835

6 Claims. (Cl. 178—5.4)

This invention relates to color television and more particularly to the simplification of reproducing apparatus for forming a single color image.

The reproducing apparatus as a whole becomes simple when a complete color image is formed upon substantially a single surface. Applicant has furthered this art by devising auxiliary circuitry to act upon a single electron stream in the reproducing device, thereby simplifying the video amplifier by a factor of two-thirds as well as simplifying the device itself.

Numerous color systems operate according to the sequential method. In this method, only one primary color is reproduced upon the viewing screen at any one time; whether this be a whole scanning field, a line, or an element along the line.

This invention utilizes the dynamical electron lens and the method of the arcuate path for electron streams described in my copending application, Serial No. 137,635. In the present instance, however, only one electron gun and one electron stream is used. A deflection instrumentality is added which has the effect of sequentially producing electron streams divergent from the instantaneous axis of normal scanning deflection.

The major object of this invention is to provide simple all-electronic means for the sequential reproducing of a color television image.

Another object of this invention is to provide means for causing one electron stream to sequentially perform the work of three electron streams.

Another object of this invention is to remove the need for a multiple electron gun structure in a color-reproducing cathode ray tube.

Another object of this invention is to eliminate the need for keystone correction in such a tube.

Another object of this invention is to cause one video amplifier to perform the work of three video amplifiers of the prior art.

Another object of this invention is to provide a simple color-reproducing screen construction.

These and other advantages of the present invention will become apparent from the following description and the drawings in which.

Figure 1:
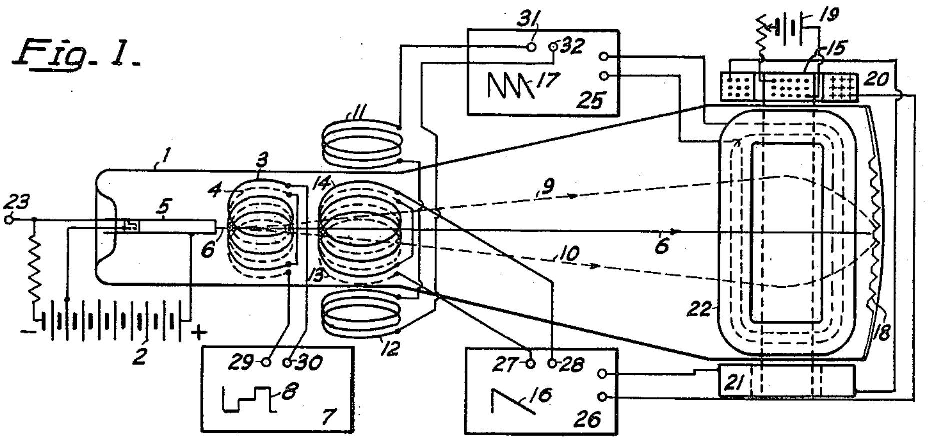
Fig. 1 shows a side elevation of one form of the present invention.

In Fig. 1, numeral 1 indicates a vacuum-tight enclosing envelope. A single electron gun 5 is powered by battery 2, or equivalent transformer-rectifier-filter means, and accomplishes emission of the single electron stream 6. Deflecting coils 3 and 4 are located on opposite sides of envelope 1 and are actuated by source 7 with a stepped waveform 8 such that divergent positions of the stream 9 and 10 are made to occur at corresponding instants in the complete color cycle in synchronism with transmitter scanning. Vertical deflecting means 13 and 14 are also shown as coils on opposite sides of envelope 1 and are connected to terminals of the vertical deflection source 26 supplying waveform 16. Similarly, coils 11 and 12, above and below the neck of device 1, are connected to horizontal deflection source 25, which supplies waveform 17.

Element 15 is a coil of wire surrounding envelope 1 near transducing screen 18 (which may be of the fluorescent type), and an essentially constant electric current is caused to flow in this coil, as by battery 19. This forms a short magnetic electron lens. The ampere-turn value thereof is adjusted until the electron stream is caused to converge upon an area adjacent to the area of undiverged impingement when the stream is in position 6. Such paths are shown as positions 9 and 10 in Fig. 1. Because of the different directions of impingement, different transducers are impacted, such as a red fluorescing phosphor upon the upper inclined surfaces of the numerous horizontal truncated ridges of screen 18 by the electron stream when following path 9; green fluorescing upon the vertical surface, via path 6, and blue fluorescing upon the lower inclined surface, via path 10. Vertical deflecting coils 13 and 14 are adjusted circumferentially around the neck of the envelope 1 to align the raster with the ridges of the screen. The truncated ridges are shown large for clarity in exposition.

Figure 2:
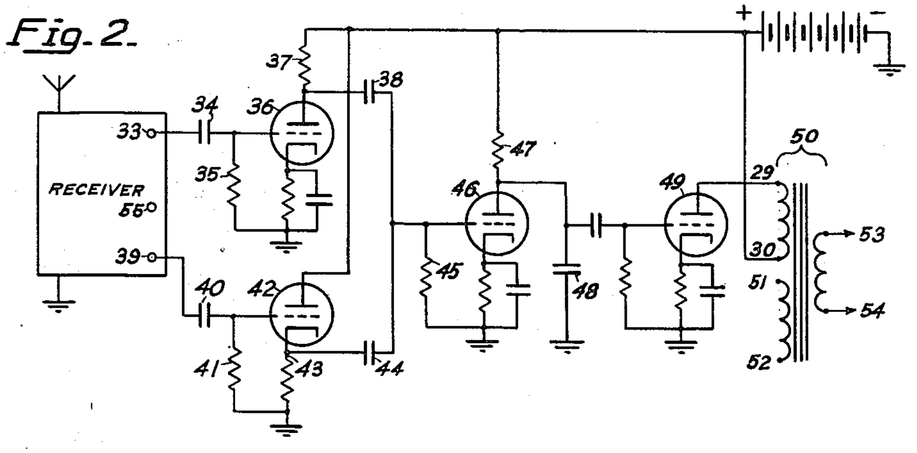
Fig. 2 shows a circuit capable of causing sequential divergence of the electron stream in coaction with deflection means.

Fig. 2 shows a typical circuit capable of producing the sequential divergence waveform 8 of device 7 of Fig. 1.

Figure 3:
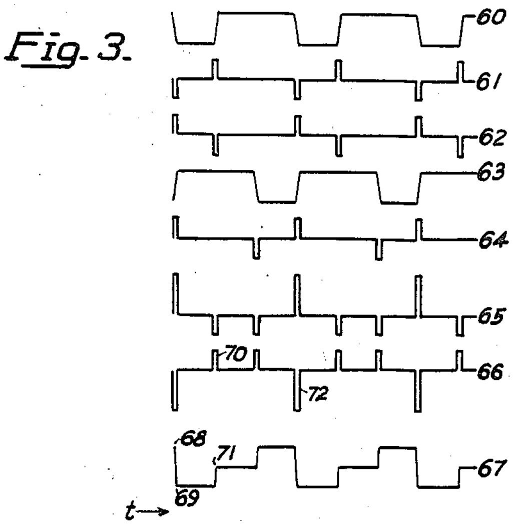
Fig. 3 shows waveforms of electrical energy pertinent to the operation of the device of Fig. 2.

Considering first the dot sequential system of color, waveform 60 of Fig. 3 is one of the color commutating waveforms, say the blue. This waveform is produced by the operation of the sampler in the television receiver and the waveform shown corresponds to clipped peaks of a sine wave which have been reversed in polarity by an amplifying stage. It is to be noted that the clipping level is such that the clipped peaks occupy but one-third of the whole time cycle. Any other waveform may be utilized as long as the relatively steep sided impulses of one-third duration can be formed. The waveform appears at terminal 33, of the receiver.

Capacitor 34 is relatively small in value, of the order of a hundred micromicrofarads, and resistor 35 is also of small value, of the order of several thousand ohms. This combination differentiates waveform 60 of Fig. 3, and the waveform 61 results.

In order to carry out the process of this invention, it is necessary that waveform 61 be reversed in phase. This is accomplished by vacuum tube 36 in which the output is taken from the plate load resistor 37 via coupling capacitor 38.

Waveform 63 is also produced by the operation of the sampler in the television receiver. The throws thereof are spaced differently in time than those in waveform 60 and correspond to another color in the operation of the system, such as red. This waveform appears at terminal 39 in Fig. 2 and is differentiated by small capacitor 40 and low-ohmage resistor 41 so that waveform 64 results. This waveform is not to be reversed in polarity and so amplifier stage 42 is provided with the output taken from the cathode resistor 43 via capacitor 44.

The two above-described outputs are combined at the grid resistor 45. The waveform there existent is shown as 65 in Fig. 3. It is the algebraic sum of waveforms 62 and 64. This combined waveform is amplified by stage 46 and is integrated in the plate circuit thereof. Amplification causes the usual phase reversal, resulting in waveform 66. This waveform does not actually occur in the operating device but can be found to exist as the driving force accomplishing the integration by temporarily disconnecting capacitor 48 and observing the voltage waveform at the plate of tube 46. Plate load resistor 47 is relatively large in ohmage, and is used essentially as a shunt feed for supplying the plate voltage to the vacuum tube. Capacitor 48 is relatively large having a small reactance at the operating frequency in relation to the resistance of resistor 47. This arrangement accomplishes integration. The pulses of waveform 66 either add or subtract from the charge on capacitor 48.

The integrated waveform is shown as 67 and the formation thereof from waveform 66 is easily understood. At the beginning of the waveform sequence shown, waveform 66 includes a pulse of twice the amplitude of the pulses of either of waveforms 62 or 64, said pulse being the result of the addition of two of the prior pulses. From a prior level 68 waveform 67 falls a two-unit decrease in value to point 69. Since the charge on the capacitor 48 is large with respect to the leakage through resistor 47, the level 69 persists until the first positive throw 70 in waveform 66 occurs. This increases the charge on capacitor 48 by one unit, i. e. up to point 71. This charge persists until a second positive throw in waveform 66 increases the charge to the original level in waveform 67, which then persists until the next negative double amplitude pulse 72 in waveform 66 occurs, and the cycle is repeated.

This waveform 67 may be applied directly to the sequential divergence coils 3 and 4 shown in Fig. 1, although it is usually desirable to increase the energy thereof by means of an amplifier stage identified by vacuum tube 49.

In either event, the waveform output may be applied to the primary of a transformer 50 shown in Fig. 2, in which instance the divergence coils 3 and 4 are not required.

In this alternate connection, the usual vertical scanning output from terminals 27 and 28 from source 26 in Fig. 1 is connected to terminals 51 and 52 of the second primary of transformer 50. The secondary, having terminals 53 and 54, is connected to the terminals of vertical deflection coils 13 and 14 in Fig. 1 and conveys a composite of waveforms 16 and 67 thereto.

The tricolor sequential video signal exists at terminal 55 in the receiver of Fig. 2 and is connected to the control grid terminal 23 in Fig. 1.

It is to be noted in passing that the device of Fig. 2 will also operate if energized with waveforms 60 and 63 of opposite polarity to those shown. The output waveform 67 is then of reversed polarity. It is also possible to interchange the waveforms 60 and 63 with respect to terminals 33 and 39. In this instance, also, the waveform 67 is reversed in polarity. Finally, should a commutating waveform be impressed at terminal 39 which has the throw of original waveform 63 advanced in time one period, the output waveform will be delayed in time one period.

The polarity and direction of winding of coils 3 and 4, 13 and 14, or the transformer connections 29 and 30 can be reversed so that various color sequence and deflection relations can be accomplished.

Figure 4:
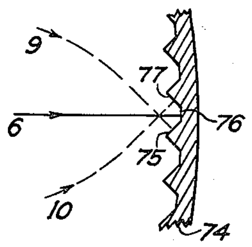
Fig. 4 shows an alternate screen construction for the device of Fig. 1, in sectional elevation.

Fig. 4 shows a novel modification of screen 18 in which phosphors or other transducers are deposited upon truncated indentations in the screen 74, instead of upon truncated protuberances. This is a simple construction, being akin to the techniques for making cut glass, either the genuine article or the manufactured imitation. Electron stream 9 impacts upon inclined surface 75, stream 6 upon surface 76, and stream 10 upon surface 77. Either of the truncated type screens has the advantage of continuing to reproduce the image, say green, upon the truncated surfaces, although malfunctioning of the circuitry or other service difficulties to which all receivers are susceptible may occur. The electron stream impinges relatively straight-on to the truncated surfaces. Keystone correction, with the possibility of maladjustment, is not required.

Figure 5:
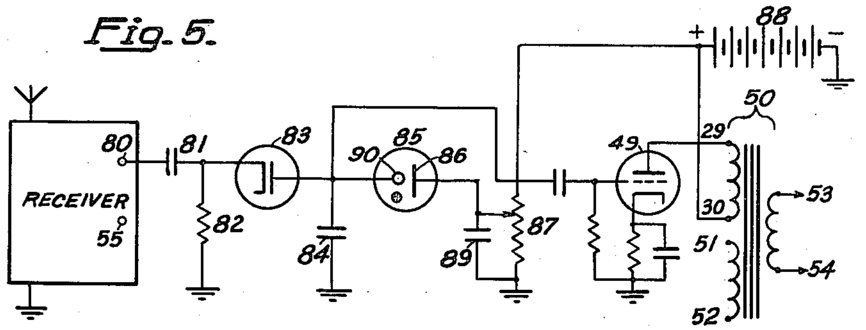
Fig. 5 shows an alternate electronic circuit for accomplishing sequential divergence.

For color systems which change color each line or each frame, an alternate circuit for device 7 as shown in Fig. 5 is possible.

In the line sequence method, line synchronizing pulses of negative polarity produced in the normal functioning of the receiver shown, appear at terminal 80 of Fig. 5. Capacitor 81 blocks the anode potential from the prior amplifier stage and resistor 82 fixes the potential level with respect to ground. This waveform is shown as 95 in Fig. 6. Diode 83 passes these negative pulses and step by step charges capacitor 84, negatively. Element 85 is a gaseous discharge tube, preferably of the regulator type. The anode 86 thereof is held at a predetermined positive potential by means of a voltage divider 87, which is connected across a source of voltage 88. Capacitor 89 is of relatively large value, for bypass purposes. When the cathode 90 of gaseous device 85 becomes slightly more negative than the potential which is required to accommodate three charge steps, tube 85 conducts and discharges capacitor 84, causing the cycle to repeat. The waveform obtained is shown at 96 in Fig. 6.

Figure 6:
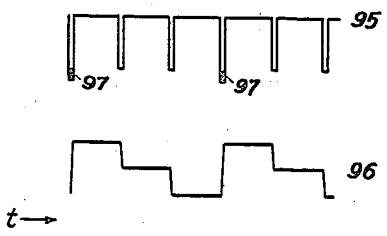
Fig. 6 shows waveforms pertinent to Fig. 5.

Should positive synchronizing pulses be more readily available at the receiver terminal 80 than the negative ones described, the device of Fig. 5 will operate if the terminals of diode 83, discharge tube 86, and battery 88 are merely reversed. In this instance, the waveforms of Fig. 6 are inverted. A positive voltage, of course, must still be retained at terminal 30, for the proper operation of the amplifying stage 49, as is known in the art.

In order that the phase of the color change be maintained, I have found that a small amplitude of the color impulse derived from the transmitted signal by other means in the receiver may also be best impressed at terminal 80. This causes each third pulse of waveform 95 to have an increased amplitude, as at 97, insuring that the breakdown of tube 85 will occur coincident therewith as the device is put into operation. As in Fig. 2, an additional amplifier stage 49 is preferable for applying the waveform to the deflecting means of the cathode ray tube assembly, either directly or via transformer 50.

Color phase may also be maintained by adding a high frequency burst or a pulse derived from it at 97 in waveform 95 only once each field or at some other infrequent interval. The increase in amplitude toward a fourth step is always sufficient to operate discharge tube 85. The primary function of the color pulse is to insure that the receiver will lock into proper color phase with the transmitter when operation begins.

For a color system which utilizes a color change each field of television scanning, the time scale of Fig. 6 is merely altered to represent the duration of one field of television scanning between pulses, a value of 1/144 second often being used. The capacitor values in the device of Fig. 5 are increased a number of times over appropriate values for the previously described line color change embodiment and operation is had for the field color change cycle.

Consideration of the method of this invention will reveal that flat-topped rectangular waves are not imperative to proper functioning of the color change process, nor are exactly equal amplitudes of the stepped wave required. A decrease in amplitude means that the path 9, for instance, would not be deflected in as sharp a curve as shown. This may be tolerated as long as the upper truncated face of screen 18 is still impacted (Fig. 1). In other words, the angle of incidence can vary a reasonable amount without causing malfunctioning.

The relatively steep sides of step waveforms 67 or 96 denote rapid writing of the electron stream upon either of the two types of screens described during the change from one color to another. Since the intensity of response of such screens is inversely proportional to this speed, the flyback traces of the electron stream will not be seen. In the dot sequential method the flyback occurs after each three dots of color. In the line by line method this occurs at the end of each third line and in the frame sequential method at the end of each third frame.

Certain variants of the preferred embodiments are possible, but the applicant has found that a one-shot relaxation device is unsuitable. Such a device dwells at either of two levels, not three as required. Attempts to synchronize a second such device to provide a third (say intermediate) level are fraught with practical synchronization difficulties.

Each of applicant's described embodiments and analogous variants are accurately synchronized with pulses derived from the color change waveforms.

Certain of the alternate constructions for this type of device disclosed in my copending application, Serial No. 137,365, may be utilized, specifically, the electrostatic type lenses and electrostatic deflection means. The simplified magnetic lens may also be used as long as the deflection of television scanning does not exceed a third of the lens diameter for the uncompensated type of construction and operation.

It will be understood that the numerical values indicated are for illustrative purposes only, and are not to limit the scope of this specification nor the appended claims.

Having thus fully described my invention, I claim:

1. A sequential color television reproducing system comprising: a cathode ray tube, means for producing an electron stream therein, means for deflecting said stream, a truncated ridged multiplanar screen in the path of said electron stream, transducers attached to the planes of said screen, the characteristics of said transducers being alike on all planes having the same inclination but being different on planes of different inclination, a dynamical electron lens for deflecting said stream located near said screen relative to the location of said prior deflecting means, means for producing electrical energy variations in synchronism with television scanning, means for activating said prior means and said dynamical lens therewith, means for producing electrical energy variations in synchronism with changes in color components to be reproduced, means for forming and combining plural series of electrical pulses in synchronism therewith, a capacitor, means to apply said plural series of pulses to said capacitor for the variation of the electrical charge thereof, means to apply said variations in charge to said prior deflecting means for the deflection of said electron stream, said lens being constituted when thus activated to cause said stream to impact said screen successively at closely adjacent areas that lie in different planes.

2. A color television reproducer comprising in combination a cathode ray tube of the type wherein a screen of separate color phosphors upon differently inclined planes exhibits different elemental colors upon being impacted by the electron stream of said tube arriving at said screen over different arcuate paths, separate circuits for differentiating color-determining signal energy, a circuit for reversing the phase of one said differentiated signal energy, a circuit for combining said differentiated and said reversed differentiated energies as a peak value charge upon a capacitor, deflection means connected to said capacitor for deflecting said electron stream, means to produce a magnetic field approximately coaxial with said electron stream between said deflecting means and said screen coacting with said deflecting means to produce said arcuate paths.

3. A color television system comprising in combination a cathode ray tube having different phosphors for exhibiting different colors which lie upon differently inclined planes, means for deflecting and controlling the intensity of the electron stream of said tube to delineate a television picture, an additional circuit responsive to color-determining signals pertaining to said picture, said circuit including plural differentiating circuits for differentiating the same plurality of said signals, means to combine said differentiated signals, a capacitor connected thereto to receive each of said signals as a charge, means to provide an essentially axial magnetic field positioned to influence said electron stream prior to impacting said phosphors, independent deflective means coactively connected to said capacitor and positioned to affect said electron stream prior to said axial means, the coaction of said latter two means causing said electron stream to impact said phosphors in closely adjacent areas over separate arcuate paths in accordance with said color-determining signals for reproducing a color television picture.

4. A color television reproducing system comprising in combination a cathode ray tube of the type wherein the color image is exhibited upon a screen of truncated triangular cross-section having different color-producing phosphors on differently inclined planes and an essentially axial magnetic field influences the electron stream of said tube before the stream reaches the screen, a circuit for reproducing less than the full plurality of color signals associated with said color image, separate circuits for differentiating each said signal, a circuit for combining said thus-processed signals, said circuit including a capacitor and means for accumulating a charge on said capacitor proportional to the algebraic sum of said differentiated signals, means to deflect the electron stream of said tube in accordance with the charge on said capacitor, the combination of said deflection and the influence of said axial field causing said stream to impact said screen in closely adjacent areas over separate arcuate paths upon different phosphors thereof in accordance with said color signals for the formation of the color image.

5. A color television reproducing system comprising the combination of a cathode ray tube of the type wherein the color image is exhibited on a screen having different colored-light-producing phosphors on differently inclined planes and wherein an essentially axial magnetic field influences the electron stream of said tube after deflection thereof and before reaching said screen, with means for reproducing less than the full plurality of color-determining signals associated with said color image, separate circuits for differentiating each said signal, a circuit for reversing the phase of one differential signal, a circuit for combining all said differentiated signals, a capacitor in said circuit accepting each said differentiated signal as a charge, isolating means associated with said capacitor to retain said charge substantially undiminished until such time as the next differentiated signal arrives, means for deflecting said electron stream in proportion to said charge, said axial field coacting therewith to deflect said stream in a separate arcuate path for each differentiated signal for the period of time until the next said differentiated signal, said stream impacting a single kind of phosphor during said period.

6. A color television reproducing system comprising in combination a color cathode ray tube of the type wherein the color image is exhibited on a screen having different color phosphors on inclined planes of different inclination and at least one dimension of the order of picture element size by a deflected electron stream subsequent to deflection traversing a magnetic field substantially coaxial with said electron stream before impinging upon said screen, a circuit for reproducing plural series of electrical energy variations in synchronism with changes in excitation required from one to another of said different phosphors according to the color image to be reproduced, separate circuits for differentiating each series, a circuit for combining said differentiated series in such relative phase that more differentiated variations of one polarity than of the opposite polarity occur in the resulting series, a capacitor connected to said circuit to assume a charge proportional to said combined differentiated variations, said capacitor sufficiently isolated in said circuit to substantially retain the peak value of one differentiated variation until the peak value of the succeeding variation of the combined series occurs, means for additionally deflecting said electron stream in accordance with the value of said charge, said coaxial field coacting with said stream to deflect the same in a unique arcuate path for each said charge, said stream impacting a single phosphor during the time said charge persists for the element by element formation of the color image.

HARRY R. LUBCKE.

References Cited in the file of this patent

UNITED STATES PATENTS

| Number | Name | Date |
|---|---|---|
| 2,307,188 | Bedford | Jan. 5, 1943 |
| 2,431,115 | Goldsmith | Nov. 18, 1947 |
| 2,446,249 | Schroeder | Aug. 3, 1948 |
| 2,446,440 | Swedlund | Aug. 3, 1948 |
| 2,446,791 | Schroeder | Aug. 10, 1948 |
| 2,529,485 | Chew | Nov. 14, 1950 |
| 2,532,511 | Okolicsanyi | Dec. 5, 1950 |
| 2,618,700 | Weimer | Nov. 18, 1952 |